W. N. ALLAN.
VEHICLE WHEEL.
APPLICATION FILED AUG. 8, 1919.

1,353,700.

Patented Sept. 21, 1920.
2 SHEETS—SHEET 1.

WITNESSES:

INVENTOR
William N. Allan,
BY
ATTORNEY

W. N. ALLAN.
VEHICLE WHEEL.
APPLICATION FILED AUG. 8, 1919.
1,353,700.
Patented Sept. 21, 1920.
2 SHEETS—SHEET 2.
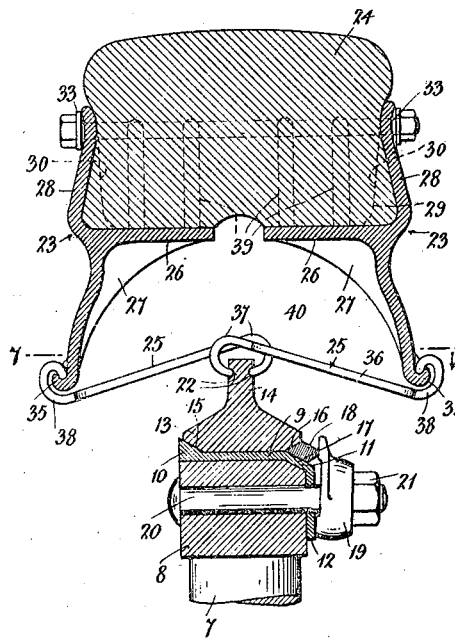
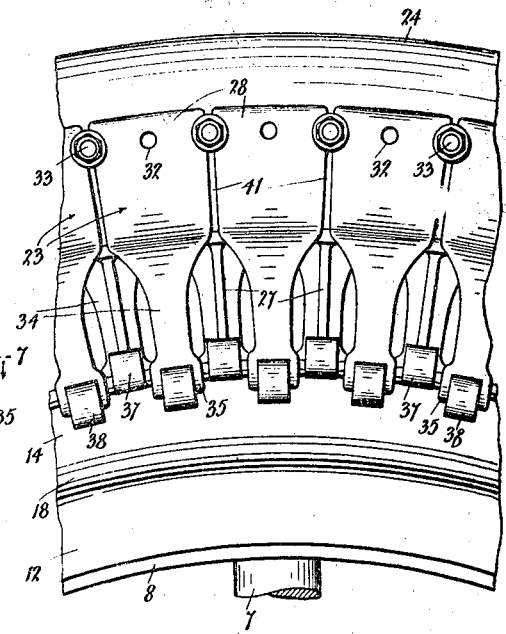
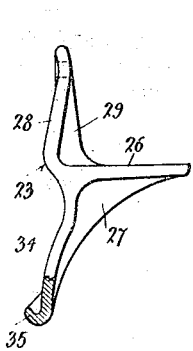
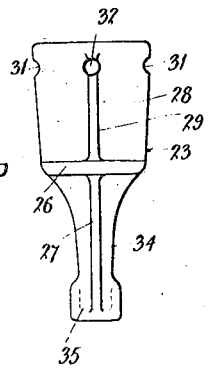
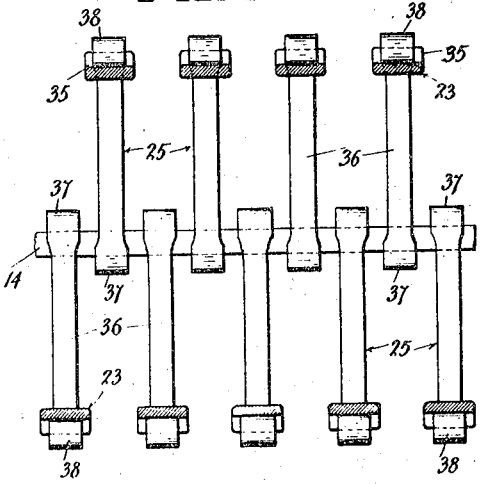
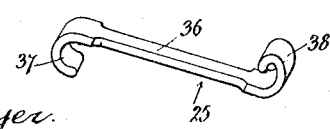
WITNESSES:
INVENTOR
William N. Allan,
BY
ATTORNEY

UNITED STATES PATENT OFFICE.

WILLIAM N. ALLAN, OF SAN ANTONIO, TEXAS.

VEHICLE-WHEEL.

1,353,700.  Specification of Letters Patent.  Patented Sept. 21, 1920.

Application filed August 8, 1919. Serial No. 316,161.

*To all whom it may concern:*

Be it known that I, WILLIAM N. ALLAN, a citizen of the United States, residing at San Antonio, in the county of Bexar and State of Texas, have invented new and useful Improvements in Vehicle-Wheels, of which the following is a specification.

This invention relates to vehicle wheels, and particularly to a tire therefor. The present invention embodies features of improvement relatively to the construction disclosed in my pending application Serial No. 159,702, filed April 4, 1917, and in my United States Patents Nos. 1,290,033 and 1,297,052 dated January 7, 1919 and March 11, 1919, respectively. As in my previous structures, one of the objects of the present improvement is to dispense as much as possible with all fastening bolts, rivets, or other penetrating devices, and avoid weakening the parts of the tire and also facilitate assemblage of the tire members in a strong operative relation. In the present construction also the tire organization as a whole is sensitively resilient and embodies practically a solid tread which in the present instance has lateral yielding qualities and is held operatively connected to a removable rim by particular forms of tire holding clips and springs. The springs in the present improved tire are also arranged to work freely in any direction and compensate for side stress as well as angular positions to accommodate variations in the road surface over which the wheel bearing the tire may move. The springs in the present instance are of straight or bar type and flat throughout the greater portion of their lengths and are provided with reversely bent connecting terminals for engagement with tread holding clips and the removable rim forming part of the tire organization.

The invention consists in the construction and arrangement of the several parts which will be more fully hereinafter described and claimed.

In the drawings:

Fig. 3 is an enlarged side elevation of a portion of the wheel and tire.

Fig. 4 is a transverse vertical section taken through the tire and wheel as shown by Fig. 3.

Figs. 5 and 6 are detail views respectively in inner side and end elevation of one of the tread holding clips, the end elevation being partially broken away and in section.

Fig. 7 is a horizontal section taken on the line 7—7, Fig. 4, and particularly showing the arrangement of the springs.

Fig. 8 is a detail perspective view of one of the springs.

Figure 1:
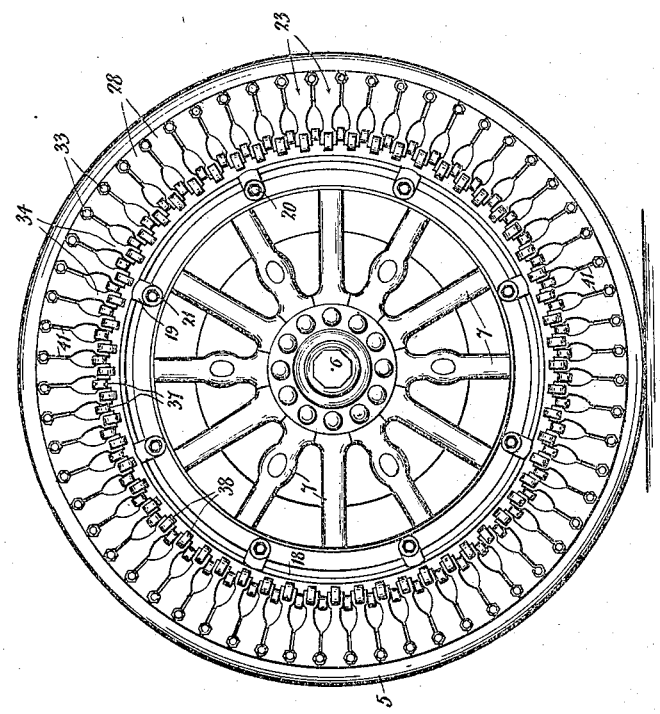
Figure 1 is a side elevation of a wheel embodying the features of the invention.
Figure 2:
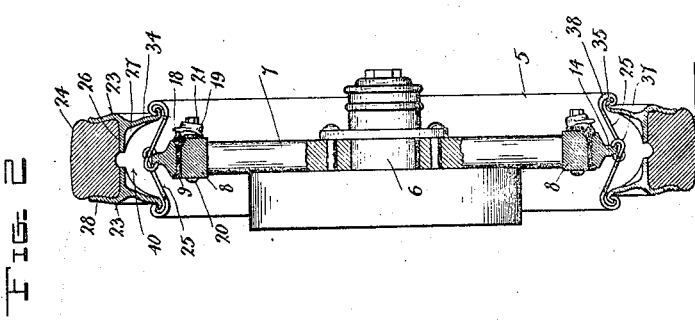
Fig. 2 is a transverse central section of the improved wheel.

The numeral 5 designates a wheel embodying a hub 6 and spokes 7 radiating from the hub to the felly 8 and provided with a metal rim 9 having a beveled side edge 10 projecting outwardly, the opposite side edge being struck inwardly at an angle, as at 11, and continued into a flange 12 extending over a portion of one side of the felly and fixed to the latter. The felly, as shown, is preferably made of wood, but it is obvious that it could be constructed of metal and the periphery thereof shaped to correspond to the contour of the rim 9. In other words, the felly and rim may be made in one piece or in two parts as desired, the metal rim 9, as shown, obviating wear on the felly when the latter is constructed of wood. The wheel is also provided with a removable rim 13 which constitutes part of the tire organization and is formed or provided with an outwardly projecting flange 14 centrally disposed with relation to the said removable rim. This rim 13 is held on and surrounds the fixed rim 9 and the base thereof is provided with opposite bevels, as at 15 and 16, the bevel 15 fitting snugly upon the enlarged beveled side edge 10 of the rim 9 and the bevel 16 coöperating with the downward bevel 11 of the rim 9 to form a seat 17 in which a locking or keying ring 18 is removably held by flange collars or washers 19 engaged by bolts 20 extending through the felly 8, the washers 19 being held in snug engagement with the ring 18 as shown by Fig. 4 through the medium of nuts 21. It will therefore be understood that the rim 13 with its flange 14 together with the parts connected to the flange and constituting the tire organization may be readily applied to or withdrawn from the felly 8 and rim 9 of the wheel 5 and when in applied position will be positively held against displacement or loose movement.

At regular intervals the flange 14 will be engaged by spring components and for this purpose the opposite sides thereof are formed with grooves or seats 22, as clearly shown by Fig. 4.

The present improvement embodies a particular form of resilient tire organization supported by the flange 14 and is removable from and applicable to the rim 9, as hereinbefore explained, and the said tire organization may be partially dismembered for repair and substitution of the elements thereof without displacing the rim 13 and its flange 14 from applied position on the wheel. This tire organization in the present instance embodies a plurality of tread holding clips 23, a practically solid tread 24 of elastic material, such as rubber or rubber composition, and a plurality of springs 25 which connect the inner extremities of the tread holding clips 23 to the flange 14 of the rim 13. The clips are all of duplicate construction and are arranged in alternate relation at opposite sides of the tire, the intermediate portions of the clips on one side being disposed opposite the adjacent side edges or joints of the clips at the remaining side. Each clip is provided with an intermediate inwardly projecting flange or table 26 having an inwardly projecting strengthening web 27, the outer extremity of each clip being broadened or formed with a head 28, and from the center of the inner side of each head a tread-engaging web 29 extends inwardly to the flange 26 to enter recesses 30 formed at regular intervals in the sides of the tread 24. The side edges of the head 28 near the outer end of the latter are formed with recesses 31 which conjointly form bolt openings when the clips are assembled in operative position, and the clips also have central openings 32 formed therein and whereby connecting bolts 33 may be inserted between and through the recesses 31 and openings 32 of the respective clips and through the tread 24 at regular intervals. The inner extremity of each clip tapers inwardly as at 34, and terminates in an outwardly bent or directed hook 35. The springs 25 are preferably of the form shown by Fig. 8 and comprise straight flat body bars or members 36 with reversely bent or directed hooks 37 and 38 at their opposite ends, the hooks 38 having a more pronounced coil or spiral bend to fit over and engage the hooked terminals 35 of the clips. The hooks 37 are of a more open structure and the ends thereof are caused to engage the grooves 22 of the flange 14 of the rim 13 in the manner clearly shown by Figs. 4 and 7. The springs 25 are alternately arranged or have their inner ends extending past each other, as shown by Fig. 7, and correspond to the alternate arrangement of the clips 23, each clip having one of the springs 25 in engagement therewith and resiliently connecting the inner reduced extremity thereof to the flange 14 of the rim 13.

The flanges 26 of the clips 23 extend inwardly in opposition and in horizontal alinement only partially across the inner side of the tread 24, the said tread having flat portions bearing on the said flanges 26, the tread being recessed, as at 39, from its base or bearing side outwardly to about a point where the bolt or bolt rods 33 extend transversely through the tread. These recesses 39 allow lateral compression and expansion of the tread in addition to the yielding or resilient action of the tread in a radial direction when weight pressure is imposed thereon. It will also be seen that the springs 25 have ample room to operate within the arched space 40 provided by the inner extremities of the clips.

When the wheel bearing the improved tire is subjected to pressure, the inner free ends of the flanges or tables 26 tend to move inwardly and exert an outward drawing action on the inner extremities 34 of the clips 23 which is resisted by the connection of the heads 28 of the clips to the tread and thereby exerting an outward pulling tension on the springs 25 and causing the inner hooks 37 of these springs to more firmly engage or grip the opposite sides of the flange or projection 14. This operation will prevent the disengagement of the springs 25 from the flange 14, and the greater the pressure on the tread the stronger will be the resistance to disengagement of the said springs from the flange. This action of the parts just specified also provides for a compensating resilient action of the tire relatively to the wheel and results in a cushioning effect of the tire organization as a whole. It will be understood that if the weight from the wheel is in an outward direction against the inner extremities 34 of the clips 23 that a reverse action will ensue and in either case the clearance or space in the tread provided by the recesses 39 cause the said tread to contribute to the general resilience of the tire. When the tread is relieved of pressure, all of the parts of the tire organization resume a normal position, but during pressure on the tread the clips regularly conform and distribute the pressure effect on the lower portion of the tire in opposite directions, the side edges of the heads of the clips being spaced far enough apart, as at 41, to avoid any stiff action or resistance by permitting sufficient play of the clips.

The springs 25 as well as the clips 23 may be readily assembled or removed and any one of the springs may be taken out and replaced by another if found necessary, and it will be understood that the springs may be of any thickness or general dimensions desired. Moreover, all of the clips are of the same pattern and can therefore be economically constructed. The tread 24 will be positively held between the clips and cannot shift circumferentially or move outwardly in a radial direction from the clips and it is thus always held in positive position for practical operation.

What is claimed is:

1. A tire comprising a removable rim, a plurality of oppositely disposed clips with inner laterally movable extremities, straight springs detachably connected to the inner extremities of the clips and to the said rim, and a tread disposed between and secured to the outer extremities of the clips and having recesses extending partially therethrough at regular intervals to permit lateral compression and expansion of the tread between the clips, the inward compression of the tread laterally moving the inner clip extremities.

2. A tire comprising a removable rim having a flange, a plurality of clips with inner laterally movable extremities, straight springs interposed between and removably connected to the inner extremities of the clips and to the flange of the rim, and a yielding tread member held between the outer portions of the clips and connected to the latter, and operating through its compression to laterally move the said inner extremities of the clips.

3. A tire comprising a removable rim having a flange, a plurality of alternately arranged clips at opposite sides of the tire provided with inwardly projecting horizontal flanges terminating at distances apart from each other, the inner extremities of the clips being reduced and formed with hooks, a plurality of flat springs having opposite hooked terminals respectively engaging and removably connected to the hooks at the inner extremities of the clips and the rim flange, and a yielding tread disposed between the clips and bearing on the flanges of the latter and connected to the outer extremities thereof.

4. A tire comprising a removable rim having a flange, a plurality of clips arranged in alternation at opposite sides of the tire and formed of outer broad heads and inner reduced extremities terminating in hooks, each of the clips also having an inwardly projecting flange terminating a distance apart from the flanges of the clips on the opposite side of the tire, springs having hooked terminals removably connecting the rim flange and the hooks at the inner extremities of the clips, a tread member mounted between the clips and bearing on the flanges thereof, securing devices engaging the tread and the clips on the opposite sides of the tire.

In testimony whereof I have hereunto set my hand in presence of two subscribing witnesses.

WILLIAM N. ALLAN.

Witnesses:
 JAMES L. MURRILL,
 LEWIS M. KEIZER.